United States Patent
Okatsu

(10) Patent No.: US 11,225,858 B2
(45) Date of Patent: Jan. 18, 2022

(54) METHANE GAS PRODUCTION FACILITY AND METHANE GAS PRODUCTION METHOD

(71) Applicant: JGC Corporation, Yokohama (JP)

(72) Inventor: Komei Okatsu, Yokohama (JP)

(73) Assignee: JGC Corporation, Yokohama (JP)

( * ) Notice: Subject to any disclaimer, the term of this patent is extended or adjusted under 35 U.S.C. 154(b) by 0 days.

(21) Appl. No.: 16/954,436

(22) PCT Filed: Dec. 20, 2017

(86) PCT No.: PCT/JP2017/045730
§ 371 (c)(1),
(2) Date: Jun. 16, 2020

(87) PCT Pub. No.: WO2019/123571
PCT Pub. Date: Jun. 27, 2019

(65) Prior Publication Data
US 2021/0087913 A1    Mar. 25, 2021

(51) Int. Cl.
*E21B 43/20*     (2006.01)
*B01D 19/00*     (2006.01)
*E21B 43/01*     (2006.01)

(52) U.S. Cl.
CPC .......... *E21B 43/20* (2013.01); *B01D 19/0036* (2013.01); *E21B 43/01* (2013.01)

(58) Field of Classification Search
CPC .. E21B 43/20; E21B 41/0099; B01D 19/0036
See application file for complete search history.

(56) References Cited

U.S. PATENT DOCUMENTS

| 7,222,673 | B2 * | 5/2007 | Graue | C09K 8/52 166/305.1 |
| 7,963,328 | B2 * | 6/2011 | Khinkis | E21B 41/0064 166/265 |
| 8,783,364 | B2 * | 7/2014 | Ikegawa | E21B 43/164 166/371 |

(Continued)

FOREIGN PATENT DOCUMENTS

| JP | 3899409 B2 | 3/2007 |
| JP | 2009011964 A | 1/2009 |

(Continued)

*Primary Examiner* — Matthew R Buck
(74) *Attorney, Agent, or Firm* — Jordan and Koda, PLLC

(57) ABSTRACT

A methane gas production facility or the like capable of efficiently producing a methane gas from a wide range of a methane hydrate layer. In a methane gas production facility that produces a methane gas from a methane hydrate layer MHL, a first horizontal well is provided along the methane hydrate layer MHL and injection water supply units supply injection water obtained by dispersing a carbon dioxide gas in water to the first horizontal well. A second horizontal well is provided along an area in which methane released from methane hydrate by replacement with carbon dioxide rises, a decompression and suction unit decompresses the inside of the second horizontal well by pumping water and sucks water containing methane, and a gas-liquid separation unit separates a methane gas from the sucked water.

11 Claims, 3 Drawing Sheets

(56) References Cited

U.S. PATENT DOCUMENTS

| | | | | |
|---|---|---|---|---|
| 8,925,632 B2* | 1/2015 | Bunio | .................... | E21B 43/20 |
| | | | | 166/268 |
| 2004/0200618 A1* | 10/2004 | Piekenbrock | ....... | E21B 41/0057 |
| | | | | 166/305.1 |
| 2012/0125610 A1 | 5/2012 | Prentice, III | | |
| 2015/0240715 A1* | 8/2015 | Dhanuka | .................. | C10L 3/06 |
| | | | | 60/780 |

FOREIGN PATENT DOCUMENTS

| | | | | | |
|---|---|---|---|---|---|
| JP | 2010502860 | A | | 1/2010 | |
| JP | 2010209591 | A | * | 9/2010 | ......... E21B 41/0064 |
| JP | 2014502322 | A | | 1/2014 | |
| JP | 5748985 | B2 | | 7/2015 | |
| JP | 2016166487 | A | | 9/2016 | |
| WO | 2007023943 | A1 | | 3/2007 | |
| WO | 2012/061027 | A1 | | 5/2012 | |

* cited by examiner

METHANE GAS PRODUCTION FACILITY AND METHANE GAS PRODUCTION METHOD

BACKGROUND OF THE INVENTION

The present invention relates to a technology of producing a methane gas from a methane hydrate layer.

As unconventional resources, methane hydrate (also referred to as gas hydrate) existing in a deep sea and frozen soil layer has been gaining attention. The methane hydrate is a solid substance that exists in a cage structure (clathrate) of water molecules such that guest molecules mainly composed of methane molecules are incorporated therein under low-temperature and high-pressure conditions.

As a method for producing methane from this methane hydrate, a method of decomposing methane hydrate by a heating or decompressing treatment and collecting a released methane gas has been examined.

However, in the heating method, it is difficult to widely heat a methane hydrate layer spreading under deep sea or frozen soil layer from an economic viewpoint.

Further, the production of the methane gas according to the decompressing method is more economically excellent than the heating method, but in the decompression of the methane hydrate layer, it is necessary to pump a large amount of water generated during the decomposition of methane hydrate. For this reason, the problems of waste water treatment and land subsidence also need to be considered.

Furthermore, it is known that methane hydrate releases methane instead of receiving, for example, carbon dioxide ($CO_2$) to be in a stable state.

By using this characteristic, a technology of injecting, for example, liquid $CO_2$ into a methane hydrate layer so as to release and collect a methane gas while maintaining the hydrate layer receiving $CO_2$ is also examined (for example, see Patent Document 1).

As the technology of injecting liquid $CO_2$, Patent Document 2 discloses a technology of easily dispersing liquid $CO_2$ by dispersing the liquid $CO_2$ as fine particles smaller than a gap of ground layers constituting a methane hydrate layer in water and receiving the $CO_2$ into the ground layer in an emulsion state.

In this way, a methane gas production technology using $CO_2$ has been developed from various viewpoints, but is not commercialized yet. In this regard, there is much room for developing a technology that enables more efficient production of a methane gas from a methane hydrate layer that extends over a wide area.

Furthermore, Patent Document 3 describes a technology of collecting a methane gas by providing a pair of horizontal wells in a methane hydrate sedimentary layer in the vertical direction, supplying hot water or steam to these horizontal wells so as to decompose methane hydrate between the pair of wells and reduce a flow resistance, switching a hot water or steam supply source only to the lower horizontal well, and sampling water containing bubbles of the methane gas from the upper horizontal well so as to separate a gas and a liquid from each other.

However, as described above, this technology is only for the heating method described above in that methane hydrate is heated and also has a large problem from the viewpoint of economy.

CITATION LIST

Patent Document

Patent Document 1: International Publication No. WO 2012/061027 A1
Patent Document 2: Japanese Patent No. 5748985 B2
Patent Document 3: Japanese Patent No. 3899409 B2

SUMMARY OF THE INVENTION

Technical Problem

The invention has been made in view of such circumstances and provides a methane gas production facility and a methane gas production method capable of efficiently producing a methane gas from a wide range of a methane hydrate layer.

Solution to Problem

A methane gas production facility of the invention is a methane gas production facility for producing a methane gas from a methane hydrate layer, including: a first horizontal well that is provided along the methane hydrate layer; an injection water supply unit that supplies injection water obtained by dispersing a carbon dioxide gas in water to the first horizontal well in order to inject the injection water into the peripheral methane hydrate layer through the first horizontal well; a second horizontal well that is provided along an area which is located above the first horizontal well and in which methane released by replacement with carbon dioxide rises after the carbon dioxide in the injection water is received into the methane hydrate; a decompression and suction unit which decompresses an inside of the second horizontal well by pumping water and sucks water containing methane from the peripheral methane hydrate layer through the inside of the second horizontal well; and a gas-liquid separation unit which separates a methane gas from water sucked using the decompression and suction unit.

The methane gas production facility may have the following features.

(a) The injection water supply unit includes a carbon dioxide dispersion unit which disperses a carbon dioxide gas in a state of a dispersion having a diameter of 10 nm to 1 μm to the injection water. The carbon dioxide gas dispersed by the carbon dioxide dispersion unit is contained in the injection water in a supercritical fluid state.

(b) The injection water supply unit supplies the injection water obtained by dispersing the carbon dioxide gas in the water from which the methane gas is separated by the gas-liquid separation unit to the first horizontal well.

(c) A distance between the first horizontal well and the second horizontal well in a height direction is in a range of 5 to 50 m.

Advantageous Effects of the Invention

According to the invention, a plurality of horizontal wells (a lower first horizontal well and an upper second horizontal well) are provided so as to extend along the methane hydrate layer and to have a vertical relationship, the periphery of the upper second horizontal well is decompressed so as to proceed the production of the methane gas by the decomposition of the methane hydrate, and the methane gas is released from the methane hydrate by the replacement action with carbon dioxide in the injection water injected at the lower first horizontal well. As a result, it is possible to efficiently produce the methane gas in a wide area provided with the horizontal well by effects of both the decompression and the carbon dioxide replacement.

DESCRIPTION OF EMBODIMENTS

Hereinafter, a configuration of a methane gas production facility according to an embodiment of the invention will be described with reference to the drawings. For example, the methane gas production facility of this example can produce a methane gas from a methane hydrate layer MHL formed on a seabed (water bottom) or a lower layer of a ground layer GL in a frozen soil area.

Figure 1:
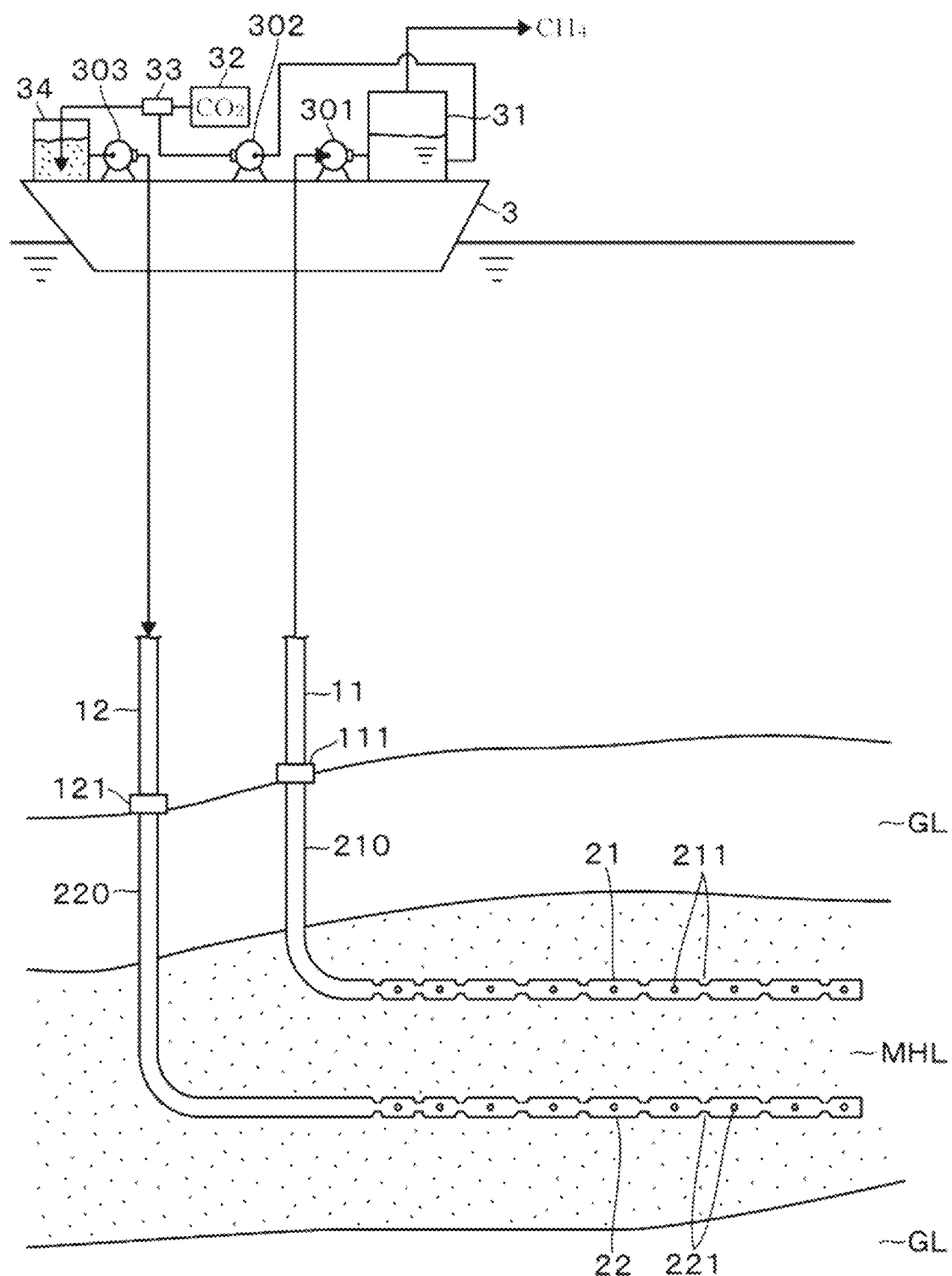
FIG. 1 is an explanatory diagram illustrating a configuration example of a methane gas production facility according to an embodiment.

FIG. 1 illustrates a configuration example of a methane gas production facility that produces a methane gas from the methane hydrate layer MHL existing on the seabed.

In the example illustrated in FIG. 1, the ground layer GL having the methane hydrate layer MHL is located, for example, on the seabed with a depth of several hundred meters or more and the methane hydrate layer MHL is located several tens meters to several hundred meters below the seabed surface of this ground layer GL.

The methane gas production facility of this example produces a methane gas from the methane hydrate layer MHL by using a first horizontal well 22 which supplies injection water containing $CO_2$ replaced with methane toward the methane hydrate layer MHL and a second horizontal well 21 which pumps flowing water to receive water containing a methane gas and decompresses the periphery.

The seabed having the methane hydrate layer MHL is provided with a base 121 which is connected to an injection water supply pipe 12 supplying injection water and a vertical well 220 which extends from the base 121 toward the methane hydrate layer MHL. The first horizontal well 22 is formed at a desired position in the methane hydrate layer MHL by a known horizontal drilling method in which a drilling angle is gradually inclined below the vertical well 220.

For example, the first horizontal well 22 has a known structure in which a casing made of a steel pipe is disposed in a well provided to extend horizontally along the methane hydrate layer MHL and the periphery of the casing is fixed with cement. The length of the first horizontal well 22 is, for example, 500 to 1000 m.

The first horizontal well 22 is provided with opening portions 221, which are formed of a plurality of perforations provided in the casing or cement fixing the casing in the circumferential direction or a plurality of sand screens provided at opened intervals in the extension direction of the first horizontal well 22, provided at a plurality of positions at opened intervals in the extension direction of the casing (FIG. 1 illustrates an example in which the opening portion is formed of perforations).

With this configuration, the inside of the first horizontal well 22 communicates with the peripheral methane hydrate layer MHL and the injection water supplied from the injection water supply pipe 12 can be injected toward the periphery of the first horizontal well 22.

The second horizontal well 21 which is disposed to be extended along the extension direction of the first horizontal well 22 is provided in an upper area provided with the first horizontal well 22.

The second horizontal well 21 also has substantially the same configuration as that of the first horizontal well 22 in that the second horizontal well is horizontally drilled from the lower side of the vertical well 210 extending from a base 111 connected to a riser pipe 11 provided in the seabed and pumping water toward the methane hydrate layer MHL, the casing of, for example, about 500 to 1000 m fixed with cement is disposed, and the opening portion 211 formed of the perforation or sand screen is provided at a plurality of positions at opened intervals in the extension direction of the casing.

As will be described later in the operation description, the second horizontal well 21 is disposed in an area where a methane gas released from methane hydrate rises due to replacement with $CO_2$ contained in the injection water injected into the methane hydrate layer MHL on the side of the first horizontal well 22. It is conceivable that the area is specified by, for example, simulating the diffusion of the methane gas in the methane hydrate layer MHL using a reservoir simulator.

When the above-described condition is satisfied, there is no particular limitation in the distance between the first horizontal well 22 and the second horizontal well 21 in the height direction, but for example, 5 to 50 m can be exemplified.

Next, a mechanism that supplies the injection water to the first horizontal well 22 and a mechanism which decompresses the inside of the second horizontal well 21 will be described. These mechanisms are provided in, for example, a floater 3 provided on the sea above the vertical wells 210 and 220.

First, the second horizontal well 21 will be described. The riser pipe 11 which is connected to the upper end of the vertical well 210 through the base 111 is extended upward to the floater 3 and is connected to a pump 301 configured with a water pump or the like. The pump 301 communicates with the inside of the second horizontal well 21 through the opening portion 211 and has a capacity of decompressing a pressure in the periphery of the second horizontal well 21 which is a high-pressure atmosphere to, for example, about 5 to 10 MPa in absolute pressure. Additionally, the capacity of the pump 301 changes in response to the pressure in the periphery of the second horizontal well 21, the length and diameter of the riser pipe 11, the vertical well 210, and the second horizontal well 21, or the like. The vertical well 210, the riser pipe 11, and the pump 301 constitute the decompression and suction unit of the embodiment.

A gas-liquid separation tank (a gas-liquid separation unit) 31 which receives water produced from the methane hydrate layer MHL (pumped by the pump 301) and separates that into a methane gas and water is provided on the ejection side of the pump 301.

The water extracted from the methane hydrate layer MHL contains the methane gas in a bubble state and the water ejected from the pump 301 stays in the gas-liquid separation tank 31 so as to release bubbles of the methane gas and is used as the injection water again.

Meanwhile, the methane gas which is separated from water in the gas-liquid separation tank 31 is transported to a methane gas utilization facility.

Additionally, the gas-liquid separation tank 31 does not need to be essentially provided on the floater 3 side, but for example, the pump 301 or the gas-liquid separation tank 31 may be disposed on the seabed. In this case, the methane gas separated from the water in the gas-liquid separation tank 31 may be extracted to the sea through the riser pipe 11 and the water subjected to the gas-liquid separation may be used as the injection water in the seabed.

Next, a mechanism which supplies the injection water to the first horizontal well 22 will be described. The injection water supply pipe 12 connected to the upper end of the vertical well 220 through the base 121 is extended upward to the floater 3 and is connected to the injection water supply tank 34 through the pump 303. The injection water supply tank 34 stores the injection water obtained by dispersing a $CO_2$ gas in water. The pump 303 communicates with the inside of the first horizontal well 22 through the opening portion 221 and has a capacity of injecting the injection water toward the methane hydrate layer MHL in the periphery of the first horizontal well 22, for example, at a pressure of about 10 to 20 MPa in absolute pressure. Additionally, the capacity of the pump 303 also changes in response to the peripheral pressure of the first horizontal well 22, the length and diameter of the injection water supply pipe 12, the vertical well 220, and the first horizontal well 22, or the like.

The injection water supply tank 34, the pump 303, the injection water supply pipe 12, and the vertical well 220 constitute the injection water supply unit of the embodiment. Further, as described above, when the gas-liquid separation tank 31 is disposed on the seabed, the pump 303 may be disposed on the seabed and the water subjected to the gas-liquid separation may be supplied as the injection water to the vertical well 220.

Here, it is preferable that $CO_2$ contained in the injection water is, for example, in a state of a dispersion having a diameter of 10 nm to 1 μm. In general, since a pressure difference between the inside and outside of the dispersion composed of a fluid dispersed in water is inversely proportional to the diameter of the dispersion, there is a high possibility that $CO_2$ exists in a supercritical fluid state in the above-described diameter range. On the other hand, bubbles in the above-described diameter range are called ultra fine bubbles (UFB) and in this specification, a supercritical $CO_2$ dispersion is also called "UFB".

For example, when the water separated from the methane gas in the gas-liquid separation tank 31 is used as the injection water, a $CO_2$ gas is supplied from a $CO_2$ gas supply unit 32 to the water extracted from the gas-liquid separation tank 31 by a transfer pump 302 through the UFB forming unit 33 so as to form a UFB of $CO_2$. The UFB forming unit 33 corresponds to the carbon dioxide dispersion unit of the embodiment.

The configuration of the UFB forming unit 33 is not particularly limited as long as a function of dispersing UFB of $CO_2$ in water is provided. For example, the UFB may be formed by passing a $CO_2$ gas through a porous body or a porous membrane made of a sintered metal, the UFB may be formed by using a shearing force of a water flow after supplying a $CO_2$ gas to an area where a swirling flow of water is formed, or the UFB may be formed by using other methods.

The concentration of $CO_2$ contained in the injection water can be exemplified, for example, in a range of 3 to 10% by mixing ratio.

Furthermore, the invention is not limited to a case in which the UFB forming unit 33 is provided in the floater 3, but the UFB forming unit may be also provided in the well. For example, when it is desired to form the UFB in a state similar to a condition of a temperature or pressure when injecting the injection water into the methane hydrate layer MHL, for example, the UFB forming unit 33 may be provided at a position near the base 121 and water and a $CO_2$ gas to be used to disperse the UFB may be separately supplied toward the UFB forming unit 33 so that the injection water having been used to form the UFB right before may be supplied toward the first horizontal well 22.

The operation of the methane gas production facility having the above-described configuration will be described with reference to FIGS. 2(a) and 2(b).

First, the pumps 301 to 303 are operated by the floater 3 to start the supplying of the injection water to the first horizontal well 22 and the pumping of water in the second horizontal well 21.

As described above, the injection water is supplied to the first horizontal well 22 at a pressure of about 10 to 20 MPa in absolute pressure and the injection water is injected into the methane hydrate layer MHL through the opening portion 221. As schematically illustrated by white arrows in FIGS. 2A and 2B, the injection water spreads in the methane hydrate layer MHL in the periphery of the first horizontal well 22 and contacts the methane hydrate.

At this time, since $CO_2$ is contained in the injection water in the state of highly dispersible UFB, $CO_2$ is easily received into the clathrate of methane hydrate and replacement with methane is easy to proceed. The UFB state can reduce the risk of leakage that $CO_2$ contained in the injection water rises in the methane hydrate layer MHL without being received into methane hydrate, reaches the second horizontal well 21, and is extracted from the MHL.

When the replacement of $CO_2$ contained in the injection water with methane contained in the methane hydrate proceeds, a methane gas is released into the methane hydrate layer MHL. Further, at this time, the methane hydrate layer may contain components other than methane, for example, components such as ethane and propane and such a mixed gas of methane and other components is also referred to as a "methane gas" in the following description.

Figure 2A:
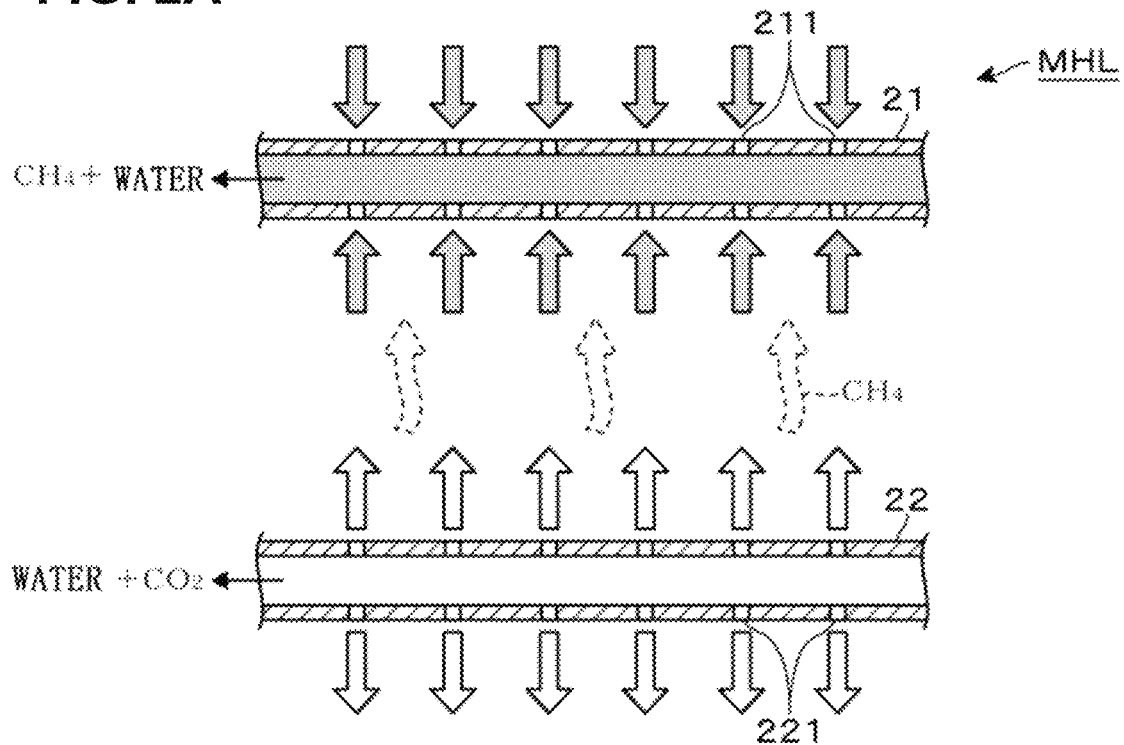
FIGS. 2A and 2B are operation diagrams illustrating a state in which a methane gas is sampled from a methane hydrate layer using first and second horizontal wells.
Figure 2B:
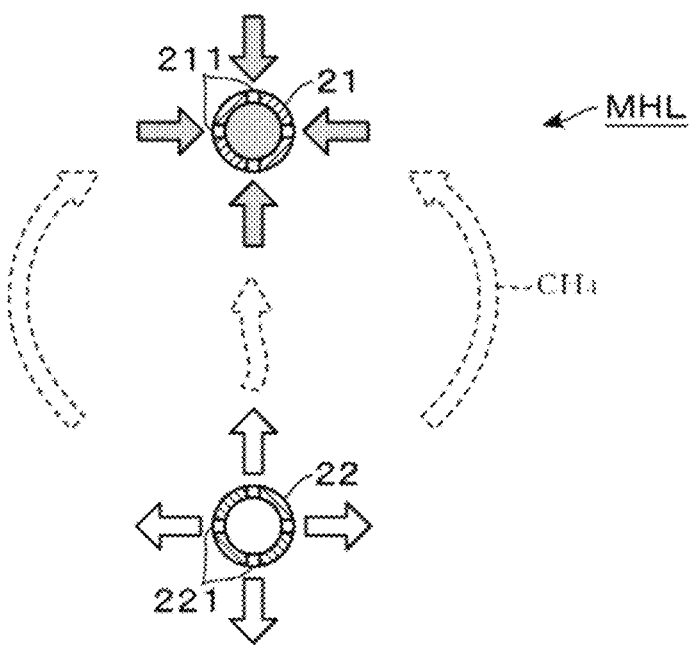

As a result, as schematically illustrated by dashed arrows in FIGS. 2A and 2B, a methane gas passes through fine gaps formed in the methane hydrate layer MHL and passes through the inside of the methane hydrate layer MHL so as to rise.

Meanwhile, in the second horizontal well 21, water in the second horizontal well 21 is pumped toward the floater 3 so that the pressure at the inside of the second horizontal well 21 and in the periphery of the second horizontal well 21 decreases to about 5 to 10 MPa in absolute pressure.

As described above, the methane hydrate exists under low-temperature and high-pressure conditions and is decomposed under a reduced pressure to produce water and methane. As schematically illustrated by gray solid arrows in FIGS. 2A and 2B, water containing the methane gas produced by the decompression flows into the second horizontal well 21 having a lower pressure.

Furthermore, as described above, the methane gas replaced with $CO_2$ in the first horizontal well 22 rises toward an area provided with the second horizontal well 21. For this reason, in the second horizontal well 21, the rising methane gas merges with the flow of water containing the methane gas produced by the decompression and flows into the second horizontal well 21.

In this way, it is possible to increase the production of the methane gas as compared with a case in which the production is performed by the decompression method alone by combining the production of the methane gas by replacement with $CO_2$ in the first horizontal well 22 and the production of the methane gas by the decompression method in the second horizontal well 21.

Further, the injection water supplied from the first horizontal well 22 also passes through the gaps of the methane hydrate and spreads in the methane hydrate layer MHL. At this time, compared with a case in which only the first horizontal well 22 is provided, water containing $CO_2$ is injected, and the methane gas produced by replacement with $CO_2$ is collected from, for example, the vertical well, the injection water easily spreads in the methane hydrate layer MHL by pumping water in the second horizontal well 21.

The pumped water after flowing into the second horizontal well 21 is sent to the gas-liquid separation tank 31 of the floater 3 so as to undergo the gas-liquid separation and the methane gas is transported to the methane gas utilization facility described above.

Meanwhile, as for the water from which the methane gas is separated, the water is extracted from the gas-liquid separation tank 31, is subjected to the dispersion of the UFB of the $CO_2$ gas in the UFB forming unit 33, and then is supplied to the first horizontal well 22 again as the injection water. Since the water is injected into the methane hydrate layer MHL, the water pumped from the second horizontal well 21 does not need to be treated and an occurrence of the land subsidence due to the decomposition of hydrate and the pumping of water in the second horizontal well 21 can be suppressed.

According to the methane gas production facility of the embodiment, there are following effects. The first horizontal well 22 and the second horizontal well 21 are provided so as to extend along the methane hydrate layer MHL and to have a vertical relationship, the periphery of the upper second horizontal well 21 is decompressed so as to proceed the production of the methane gas due to the decomposition of the methane hydrate, and the methane gas is released from the methane hydrate by the replacement action with $CO_2$ in the injection water injected in the lower first horizontal well 22. As a result, it is possible to efficiently produce the methane gas in a wide area provided with the horizontal wells 22 and 21 by the effects of both the decompression and the replacement of $CO_2$.

Here, the vertical positional relationship between the first and second horizontal wells 22 and 21 is not limited to a case in which the first and second horizontal wells are arranged in the vertical direction as in the example illustrated in FIG. 2B, but these horizontal wells may be displaced from each other in the horizontal direction.

Figure 3:
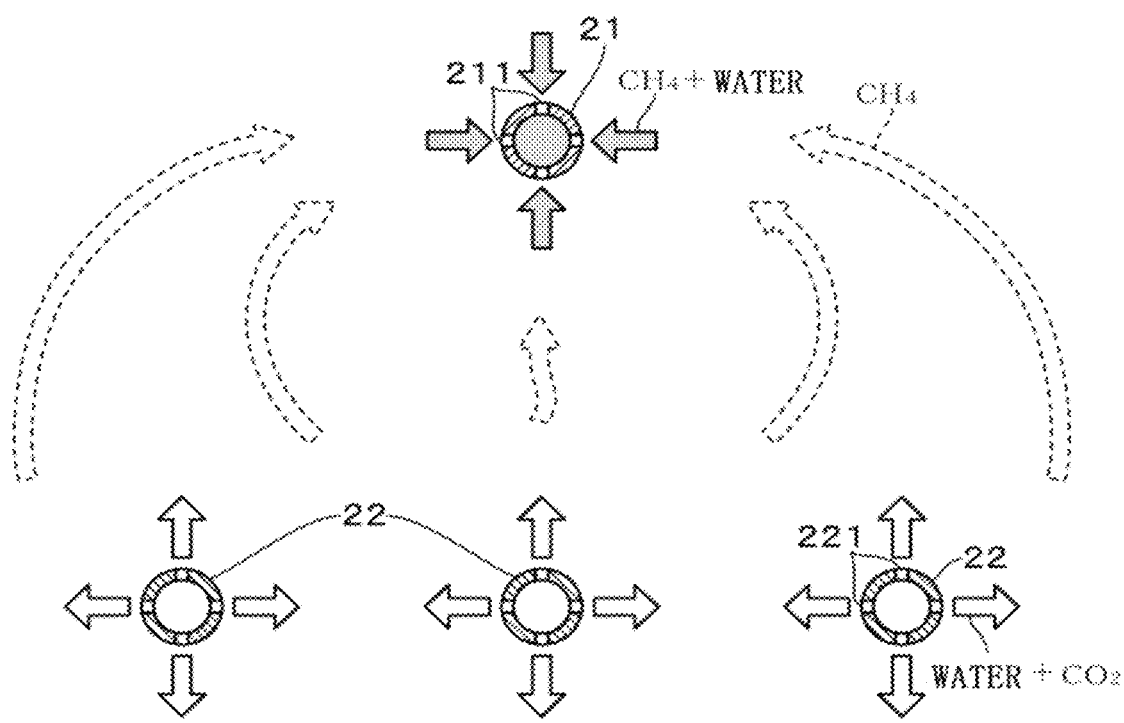
FIG. 3 is an explanatory diagram illustrating another configuration example of the first and second horizontal wells.

Further, one or both of the first and second horizontal wells 22 and 21 may be provided in plurals. FIG. 3 illustrates an example in which a plurality of first horizontal wells 22 are provided.

Further, the first horizontal well 22 and the second horizontal well 21 may be a multi-lateral type horizontal well in which a plurality of first horizontal wells 22 and second horizontal wells 21 are provided for each of the vertical wells 220 and 210.

The above-described methane gas production facility can also be applied to, for example, a case in which the vertical wells 220 and 210 are drilled from the surface of the frozen soil area, the first horizontal well 22 and the second horizontal well 21 are further provided, and the methane gas is produced. In this case, each facility provided on the floater 3 of FIG. 1 is provided on a land.

REFERENCE SIGNS LIST

MHL Methane hydrate layer
21 Second horizontal well
22 First horizontal well
31 Gas-liquid separation tank
32 $CO_2$ gas supply unit
33 UFB forming unit
34 Injection water supply tank

The invention claimed is:

1. A methane gas production facility for producing a methane gas from a methane hydrate layer, comprising:
a first horizontal well that is provided along the methane hydrate layer;
an injection water supply unit that supplies injection water obtained by dispersing a carbon dioxide gas in water to the first horizontal well in order to inject the injection water into the methane hydrate layer through the first horizontal well, wherein the carbon dioxide gas replaces methane within a portion of the methane hydrate layer peripheral to the first horizontal well causing said methane gas to be released;
a second horizontal well that extends within the methane hydrate layer, the second horizontal well having a plurality of openings, an entire span of said plurality of openings being located above said first horizontal well and being disposed to be extended along a first horizontal direction of the first horizontal well, said second horizontal well receiving said water comprising said methane gas at said plurality of openings spanned along said first horizontal direction of the second horizontal well;
a decompression and suction unit which decompresses an inside of the second horizontal well to suction said water and said methane gas from a periphery of the second horizontal well into the second horizontal well through said plurality of openings and then through an inside of said second horizontal well; and
a gas-liquid separation unit which separates the methane gas from said water sucked through the second horizontal well by the decompression and suction unit.

2. The methane gas production facility according to claim 1,
wherein the injection water supply unit includes a carbon dioxide dispersion unit which disperses a carbon dioxide gas in a state of a dispersion having a diameter of 10 nm to 1 μm to the injection water.

3. The methane gas production facility according to claim 2,
wherein the carbon dioxide gas dispersed by the carbon dioxide dispersion unit is contained in the injection water in a supercritical fluid state.

4. The methane gas production facility according to claim 1,
wherein the injection water supply unit supplies the injection water obtained by dispersing the carbon dioxide gas in the water from which the methane gas is separated by the gas-liquid separation unit to the first horizontal well.

5. The methane gas production facility according to claim 1, wherein a distance between the first horizontal well and the second horizontal well in a height direction is in a range of 5 to 50 m.

6. The methane gas production facility according to claim 1,
wherein the first horizontal well is provided to extend in the first horizontal direction within the methane hydrate layer;
wherein the second horizontal well is provided to extend in said first horizontal direction within the methane hydrate layer above the first horizontal well in an area where said methane gas from said peripheral portion of the methane hydrate layer rises;
wherein the second horizontal well is part of an extraction well, the extraction well comprising: a first extraction well portion extending from a pipe downward into said methane hydrate layer, and said second horizontal well;
wherein said extraction well receives said methane gas only at said plurality of openings spanned along said first horizontal direction of the second horizontal well; and
wherein the decompression and suction unit suctions said water and said methane gas into the second horizontal well only through said plurality of openings.

7. A methane gas production method for producing a methane gas from a methane hydrate layer, comprising:
supplying injection water obtained by dispersing a carbon dioxide gas in water to a first horizontal well provided along the methane hydrate layer;
injecting through the first horizontal well the injection water into a portion of the methane hydrate layer peripheral to the first horizontal well, wherein the carbon dioxide gas replaces methane within a portion of the methane hydrate layer peripheral to the first horizontal well causing said methane gas to be released;
decompressing an inside of a second horizontal well that extends within the methane hydrate layer, the second horizontal well having a plurality of openings, an entire span of said plurality of openings being located above said first horizontal well and being disposed to be extended along a first horizontal direction of the first horizontal well;
said decompressing comprising pumping by suction said water and said methane gas from a periphery of the second horizontal well into the second horizontal well through said plurality of openings and onward through the second horizontal well; and
separating the methane gas from said water sucked through the second horizontal well.

8. The methane gas production method according to claim 7, further comprising:
obtaining the injection water by dispersing a carbon dioxide gas in a state of a dispersion having a diameter of 10 nm to 1 μm into water supplied to the first horizontal well.

9. The methane gas production method according to claim 8,
wherein the carbon dioxide gas dispersed in the injection water is contained in the injection water in a supercritical fluid state.

10. The methane gas production method according to claim 7,
wherein the injection water is obtained by dispersing a carbon dioxide gas in water from which the gaseous methane gas is separated.

11. The methane gas production method according to claim 7,
wherein said supplying injection water obtained by dispersing said carbon dioxide gas in water comprises said supplying injection water obtained by dispersing said carbon dioxide gas in water to the first horizontal well that extends in said first horizontal direction within the methane hydrate layer;
wherein the second horizontal well is provided to extend in said first horizontal direction within the methane hydrate layer above the first horizontal well in an area where said methane gas from said peripheral portion of the methane hydrate layer rises;
wherein the second horizontal well is part of an extraction well, the extraction well comprising: a first extraction well portion extending from a pipe downward into said methane hydrate layer, and said second horizontal well; and
wherein said decompressing comprises said extraction well receiving said methane gas only at said plurality of openings spanned along said first horizontal direction of the second horizontal well.

* * * * *